(12) United States Patent
Sinclair (10) Patent No.: US 8,217,906 B2
(45) Date of Patent: Jul. 10, 2012

(54) USER INTERFACE, APPARATUS, METHOD, AND COMPUTER PROGRAM FOR VIEWING OF CONTENT ON A SCREEN

(75) Inventor: John Andrew Sinclair, London (GB)

(73) Assignee: Sony Ericsson Mobile Communications AB, Lund (SE)

( * ) Notice: Subject to any disclaimer, the term of this patent is extended or adjusted under 35 U.S.C. 154(b) by 1240 days.

(21) Appl. No.: 11/941,306

(22) Filed: Nov. 16, 2007

(65) Prior Publication Data

US 2009/0128500 A1 May 21, 2009

(51) Int. Cl.
*G09G 5/00* (2006.01)
(52) U.S. Cl. ......................... 345/173; 715/784
(58) Field of Classification Search ................... 345/173, 345/156–159; 715/784–787; 178/18.01, 178/18.03
See application file for complete search history.

(56) References Cited

U.S. PATENT DOCUMENTS

| | | | |
|---|---|---|---|
| 2002/0118168 A1 | 8/2002 | Hinckley et al. | |
| 2002/0135602 A1 | 9/2002 | Davis et al. | |
| 2003/0210286 A1 | 11/2003 | Gerpheide et al. | |
| 2005/0001815 A1 | 1/2005 | Tsunoda | |
| 2007/0273668 A1* | 11/2007 | Park et al. | 345/173 |

FOREIGN PATENT DOCUMENTS

| | | |
|---|---|---|
| EP | 1 720 091 A1 | 11/2006 |
| EP | 1 942 403 A2 | 7/2008 |
| WO | WO 03/058589 A2 | 7/2003 |

OTHER PUBLICATIONS

International Search Report, corresponding to PCT/EP2008/055957, mailed on Aug. 21, 2009.

Written Opinion, corresponding to PCT/EP2008/055957, mailed on Aug. 21, 2009.
Hurst W. et al: "Interactive, Dynamic Video Browsing with the Zoomslider Interface" IEEE International Conference on Multimedia and Expo, 2005. ICME 2005. Amsterdam, The Netherlands, Jul. 6-8, 2005, IEEE, (Piscataway, NJ, USA, Jul. 6, 2005, pp. 558-561, XP010844387.
Hurst W et al: "Interactive video browsing on mobile devices" Proceedings of the $15^{th}$ International Conference on Multimedia, Augsburg, Germany Sep. 23-28, 2007, Jan. 1, 2007, pp. 247-256 (XP008109270).
Hurst W: Interactive audio-visual video browsing: Proceedings of the MM'06 Santa Barbara, CA, USA, Jan. 1, 2006, pp. 675-678 ZP008109543, ISBN: 978-1-59593-447-5, pp. 675-676.
Ahlberg C et al: "The Alphaslider; A Compact and Rapid Selector" Proceedings of CHI: ACM Conference on Human Factors in Computing Systems, XX, XX, Apr. 28, 1994, pp. 365-371, XP001248119, p. 367.

* cited by examiner

*Primary Examiner* — Regina Liang
(74) *Attorney, Agent, or Firm* — Renner, Otto, Boisselle & Sklar, LLP (57) ABSTRACT

A user interface is disclosed, comprising a screen arranged to view content, wherein the screen is arranged to display a part of the content if there is not space for the entire content on the screen, and wherein the content is scrollable to enable the desired part of the content to be displayed; and a touch sensitive input area arranged to enable input of touch actions, wherein a first touch action is adapted to control scrolling of said content, wherein a speed relation determines a relation between a speed of scrolling and a speed of the touch action in a first direction on said touch sensitive input, and wherein the speed relation is determined by the position of the touch action on said touch sensitive area along a second direction perpendicular to said first direction. Further, an apparatus, a method, and a computer program for viewing of content on a screen are disclosed.

29 Claims, 6 Drawing Sheets

USER INTERFACE, APPARATUS, METHOD, AND COMPUTER PROGRAM FOR VIEWING OF CONTENT ON A SCREEN

FIELD OF INVENTION

The present invention relates to a user interface, an apparatus, a method, and a computer program for viewing of content on a screen.

BACKGROUND OF INVENTION

In the field of presenting information, especially on small handheld apparatuses having small screens, the problem of viewing content on a screen that do not have room for all the content at once is usually solved by enabling scrolling of the content on the screen. However, this implies another problem: control of the scrolling. Different approaches have been provided to control scrolling. WO 03/058589 A2 discloses a user-interface application and a computing apparatus has the user-interface to assist the user in searching for information from a data array. In an example given, the data array is an ordered list of addresses. The user begins at a point on a list of addresses. After the user rotates a jog/shuttle knob, the list rolls down a low rate. As the user rotates the jog/shuttle knob further the scroll accelerates. After a predetermined time or number of items, a helper character is displayed. This character may represent a first letter of a name or a first digit of a telephone number. The UI displays the helper character to the user. The user continues to hold the position of the jog/shuttle knob until a help character, corresponding to his/her desired selection, appears. The user releases the jog/shuttle knob and may step through among a smaller group of data to locate the particular selection by incrementally rotating the knob from the neutral position. A problem with this is that it might be hard for the user to predict behaviour of the apparatus when scrolling. Another problem is that accuracy will be decreased as the apparatus speeds up scrolling at further actuation of the jog/shuttle knob.

Another approach is a "grab and move" tool where a marker is locked on a position on the content and then the content is moved with the marker. Accuracy is good with this approach, but scrolling through large size content with this approach puts demand on more efficient scrolling.

Prior approaches are either more technically oriented than user intuitive, or user intuitive, but not efficient when the total amount of content is much larger than the amount of content fitting into the screen. Therefore, there is a demand for an approach that combines efficiency and accuracy.

SUMMARY

Therefore, the inventor has found an approach that is both user intuitive and efficient also for large amounts of content. The basic understanding behind the invention is that this is possible if the user is provided to control both scrolling and scrolling speed in one and same user action such that both accessibility to the desired part of the content and accuracy, e.g. upon selection of a particular item of the content, are provided in the one and same user action. The inventor realized that a user finds it intuitive to simultaneously make scrolling input in one direction and control scrolling speed in another direction of user action on a touch sensitive area. Thus, the user is in full control of both speed and accuracy in an intuitive way.

According to a first aspect of the present invention, there is provided a user interface comprising a screen arranged to view content, wherein the screen is arranged to display a part of the content if there is not space for the entire content on the screen, and wherein the content is scrollable to enable the desired part of the content to be displayed; and a touch sensitive input area arranged to enable input of touch actions, wherein a first touch action is adapted to control scrolling of said content, wherein a speed relation determines a relation between a speed of scrolling and a speed of the touch action in a first direction on said touch sensitive input, and wherein the speed relation is determined by the position of the touch action on said touch sensitive area along a second direction perpendicular to said first direction.

In this context, screen is to be considered as any means for at least two-dimensional visual rendering. Viewed content is to be construed as any graphical or textual information. Touch actions is to be construed as any operation interacting with the touch sensitive input area, and can hold temporal or spatial information, or in combination which can hold movement information. Speed is to be construed as an amount of action with relation to temporal and spatial properties.

The determined speed relation may have a range of a minimal value at one end of the screen along the second direction, and a maximal value at the other end along the second direction.

The determined speed relation range may have the maximal value corresponding to the relation between a size of the entire content to a size of the part of the content fitting into the screen. The correspondence to the relation may include a relation between the size of the touch sensitive area and the size of the screen in the first direction. This will enable to scroll through the entire content with one input movement over the touch sensitive area at maximum scrolling speed.

The determined speed relation range may have the minimum value of one to one.

The speed relation may be assigned a continuously increasing value from the minimum value to the maximum value along the second direction. Alternatively, the speed relation is assigned a plurality of discrete values increasing from the minimum value to the maximum value along the second direction.

A second touch action may be adapted to control selection of one item of said content.

The determined speed relation may have a minimal value at one end of the screen along the second direction, and a maximal value at the other end along the second direction, wherein the determined speed relation has the maximal value corresponding to the relation between the size of the entire content to the size of the part of the content fitting into the screen, the determined speed relation has the minimum value of one to one, and the speed relation is assigned a continuously increasing value from the minimum value to the maximum value along the second direction, or the speed relation is assigned a plurality of discrete values increasing from the minimum value to the maximum value along the second direction.

The touch sensitive area may be arranged on the screen, e.g. forming a touch sensitive screen According to a second aspect of the present invention, there is provided an apparatus comprising a processor and a user interface controlled by the processor, the user interface comprising features according to the first aspect of the present invention.

According to a third aspect of the present invention, there is provided a user interface method comprising viewing content on a screen, including scrolling the content where the screen is arranged to display a part of the content if there is not space for the entire content on the screen to enable the desired part of the content to be displayed; and receiving input of touch actions on a touch sensitive input area, wherein a first touch action is adapted to control scrolling of said content, including determining a speed relation which determines a relation between a speed of scrolling and a speed of the touch action in a first direction on said touch sensitive input, wherein the speed relation is determined by the position of the touch action on said touch sensitive area along a second direction perpendicular to said first direction.

The determined speed relation may have a range of a minimal value at one end of the screen along the second direction, and a maximal value at the other end along the second direction.

The determined speed relation range may have the maximal value corresponding to the relation between the size of the entire content to the size of the part of the content fitting into the screen.

The determined speed relation range may have the minimum value of one to one.

The method may further comprise assigning a continuously increasing speed relation value from the minimum value to the maximum value along the second direction.

Assigning the speed relation comprises assigning a plurality of discrete values increasing from the minimum value to the maximum value along the second direction.

The method may further comprise receiving a second touch action adapted to control selection of one item of said content.

According to a fourth aspect of the present invention, there is provided a computer program comprising instructions, which when executed by a processor are arranged to cause the processor to perform the method according to the third aspect of the invention.

According to a fifth aspect of the present invention, there is provided a computer readable medium comprising program code, which when executed by a processor is arranged to cause the processor to perform the method according to the third aspect of the invention.

DETAILED DESCRIPTION OF EMBODIMENTS

Figure 1:
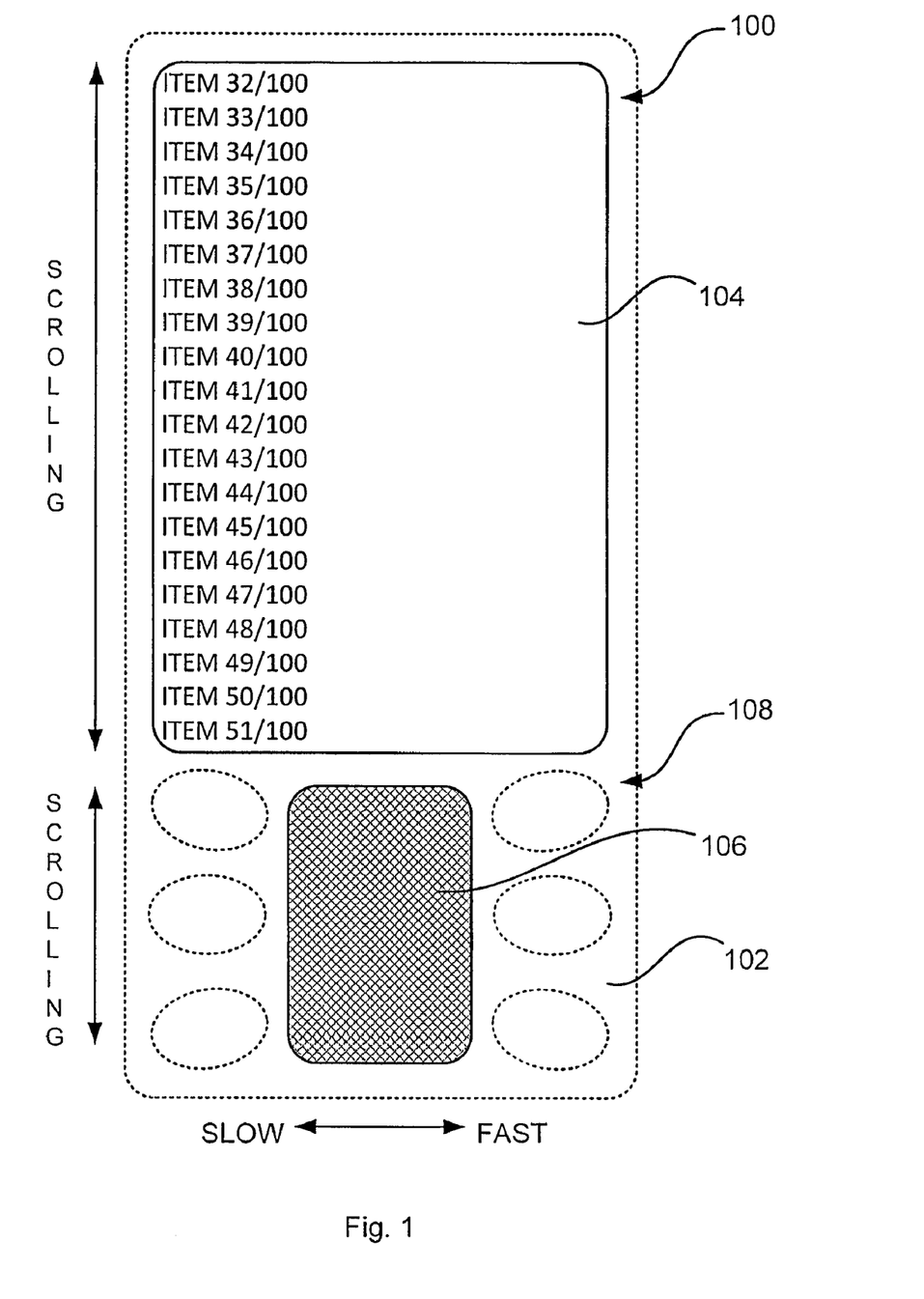
FIG. 1 illustrates a user interface according to an embodiment of the present invention.

FIG. 1 illustrates a user interface 100 according to an embodiment of the present invention. The user interface 100 is illustrated in the context of an apparatus 102, drawn with dotted lines, holding the user interface 100. The user interface 100 comprises a screen 104 for displaying information, and a touch sensitive input area 106. The touch sensitive input area 106 is arranged to determine touch input in at least two dimensions, e.g. a touch pad. The screen 104 is arranged to display content, which may be textual or pictorial, and may be divided into one or more items. The exemplary content in FIG. 1 comprises a hundred items, of which a part is viewed on the screen 104 since there is not room for all the items of the content to be viewed at once. To be able to see the desired items of the content, scrolling of the contents is enabled. In the illustrated example of FIG. 1, the content is scrolled vertically to view item no. 32 to item no. 51 of the hundred items. Scrolling of the items is performed by inputting a vertical touch action on the touch sensitive input area 106. Since there is much more content available than what is able to view at once on the screen at once, the user interface 100 is provided with variable scrolling speed, wherein the scrolling speed is determined where on the touch sensitive input area in horizontal direction the touch action is performed, e.g. fast scrolling to the right and slow scrolling to the left. Thus, the scrolling speed is variable also in one touch action by making the touch input position in both vertical and horizontal direction. In that way, a fast, efficient, accurate and intuitive scrolling control is provided to the user.

Figure 2:
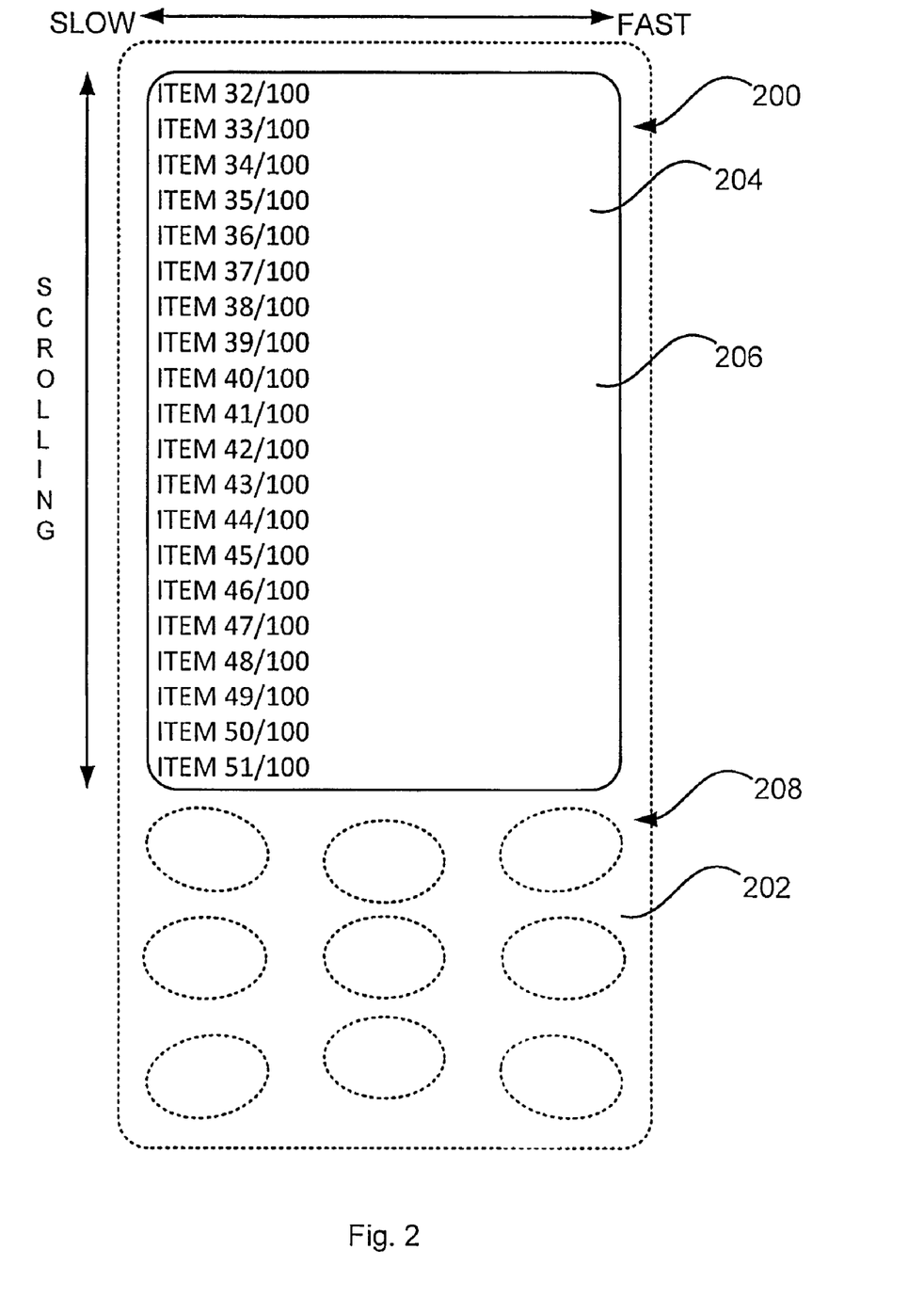
FIG. 2 illustrates a user interface according to an embodiment of the present invention.

FIG. 2 illustrates a user interface 200 according to another embodiment of the present invention. The user interface 200 is illustrated in the context of an apparatus 202, drawn with dotted lines, holding the user interface 200. The user interface 200 comprises a screen 204 for displaying information, and a touch sensitive input area 206 arranged to determine touch input in at least two dimensions, which is arranged on the screen 204 to form a touch screen. Similar to the exemplary content of FIG. 1, the content comprises a hundred items, of which a part is viewed on the screen 204, and scrolling of the contents is enabled. Scrolling of the items is performed by inputting a vertical touch action on the touch sensitive input area 206, i.e. on the screen 204. The scrolling speed is variable in one touch action by making the touch input position in both vertical and horizontal direction, whereby scrolling speed is determined by the position in the horizontal direction. In that way, a fast, efficient, accurate and intuitive scrolling control is provided to the user.

The user interface 100, 200 may also comprise other elements, such as keys 108, 208, means for audio input and output (not shown), image acquiring means (not shown), etc. The apparatus 102, 202 may be a mobile telephone, a personal digital assistant, a navigator, a media player, a digital camera, or any other apparatus benefiting from a user interface according to the present invention.

Figure 3:
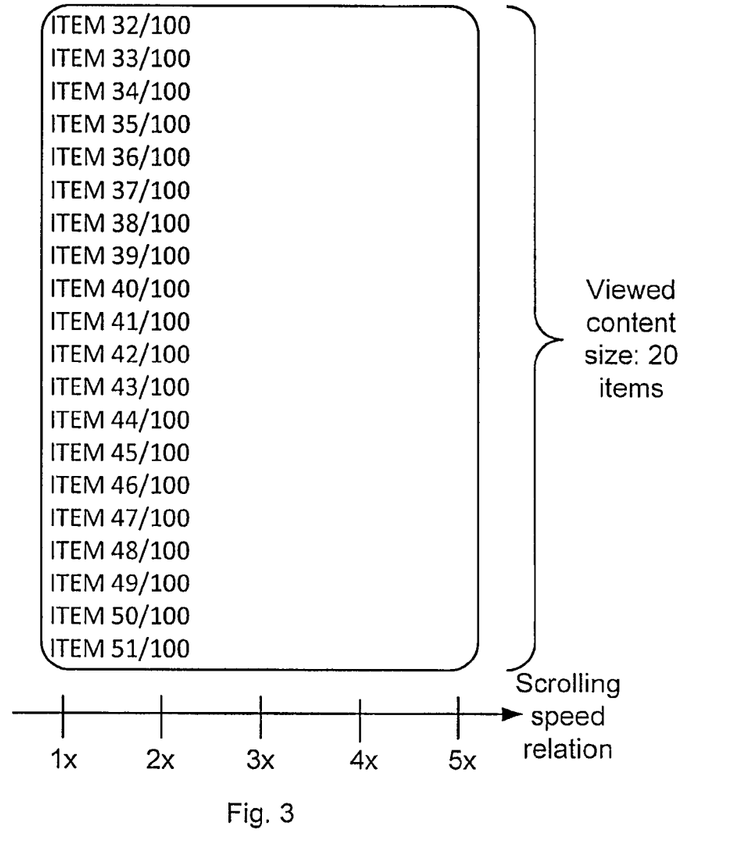
FIG. 3 illustrates an exemplary assignment of scrolling speed relation.
Figure 4A:
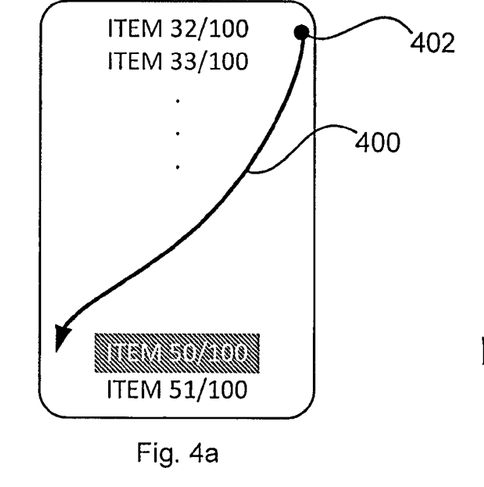
FIGS. 4a and 4b illustrate an exemplary touch input action on a user interface according to the present invention.
Figure 4B:
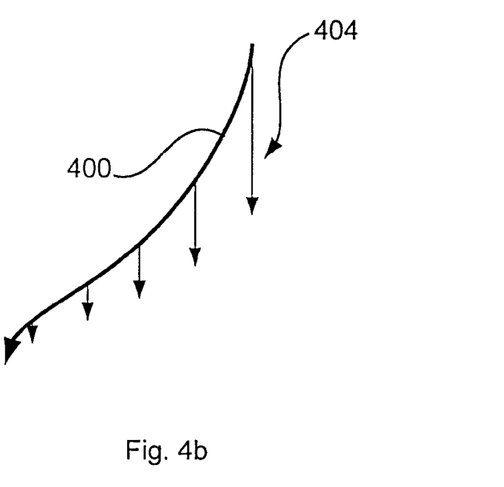

FIG. 3 illustrates an exemplary assignment of scrolling speed relation. The example is based on the exemplary content used with reference to FIGS. 1 and 2 for the sake of simpler understanding, i.e. the content comprises a hundred items, of which only twenty fits into the screen for viewing at once, which items for viewing is selectably viewed by scrolling. In this example, the screen is a touch screen, i.e. the touch sensitive area is arranged over the screen area and has the same size. The content is five times the size of what can be viewed at once on the screen (100/20=5). Thus, to be able to scroll the entire content in one go with a touch action, the relation between the touch action speed and the scrolling speed need to reach a scrolling speed relation value of five, i.e. the scrolling speed is up to five times the speed of the touch input, e.g. sliding a finger over the screen. This maximal speed of scrolling is enabled when touch action is performed at the leftmost part of the screen. To enable accurate scrolling for finding and possibly selecting a particular item, a low scrolling speed relation is provided, e.g. one-to-one, i.e. the scrolling speed is about the same as the speed of the touch action. Any scrolling speed relation between these values is achievable by the actual position of the touch action in a direction perpendicular to the scrolling direction. To illustrate this, FIG. 4a illustrates an exemplary touch action input indicated by line 400 and which starts at a starting point 402 and then moves in the arrowed direction. FIG. 4b illustrates the touch action input 400 with indications on impact on scrolling illustrated by arrows 404 for a selected number of parts of the touch input action. The scrolling can thus be considered to be an integrating function of the touch action input in two dimensions.

Figure 5:
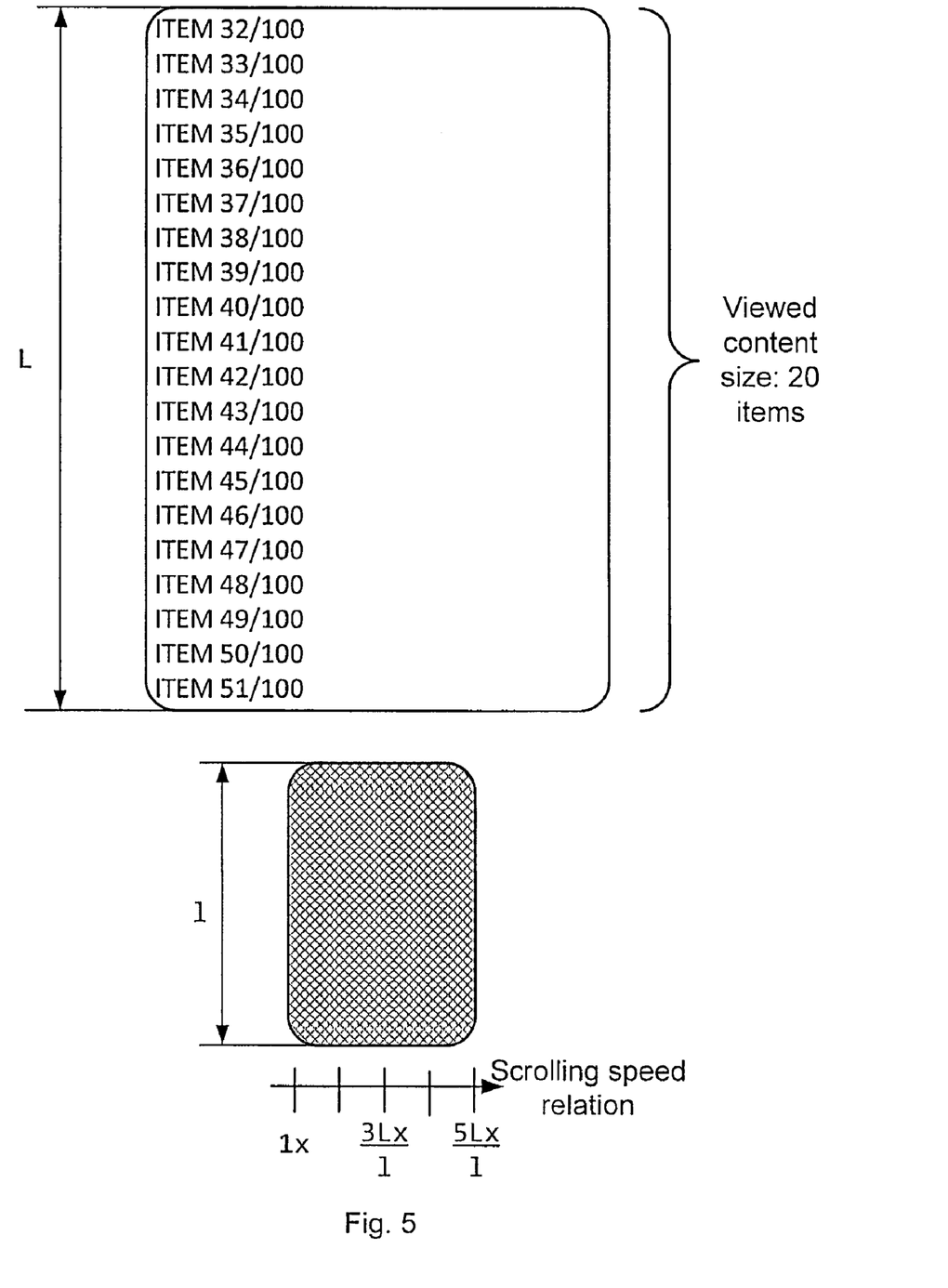
FIG. 5 illustrates an exemplary assignment of scrolling speed relation.

FIG. 5 illustrates an exemplary assignment of scrolling speed relation. The example is once again based on the exemplary content used with reference to FIGS. 1 and 2 for the sake of simpler understanding, i.e. the content comprises a hundred items, of which only twenty fits into the screen for viewing at once, which items for viewing is selectably viewed by scrolling. Different from the example of FIG. 3, here the screen and the touch sensitive area are separated, i.e. the touch sensitive area is arranged as a separate element, e.g. a touch pad. The content is five times the size of what can be viewed at once on the screen (100/20=5). Further, the relation in size between the screen and the touch sensitive area in the scrolling direction is L, to 1. Thus, to be able to scroll the entire content in one go with a touch action, the relation between the touch action speed and the scrolling speed need to reach a scrolling speed relation value of five times L/1, i.e. the scrolling speed is up to five times the relation between the size of the screen and the touch sensitive area times the speed of the touch input, e.g. sliding a finger over the touch pad. This maximal speed of scrolling is enabled when touch action is performed at the rightmost part of the touch sensitive area. Similar to the embodiment disclosed with reference to FIG. 3, to enable accurate scrolling for finding and possibly selecting a particular item, a low scrolling speed relation is provided. Any scrolling speed relation between the minimum and the maximum values is achievable by the actual position of the touch action in a direction perpendicular to the scrolling direction.

Figure 6:
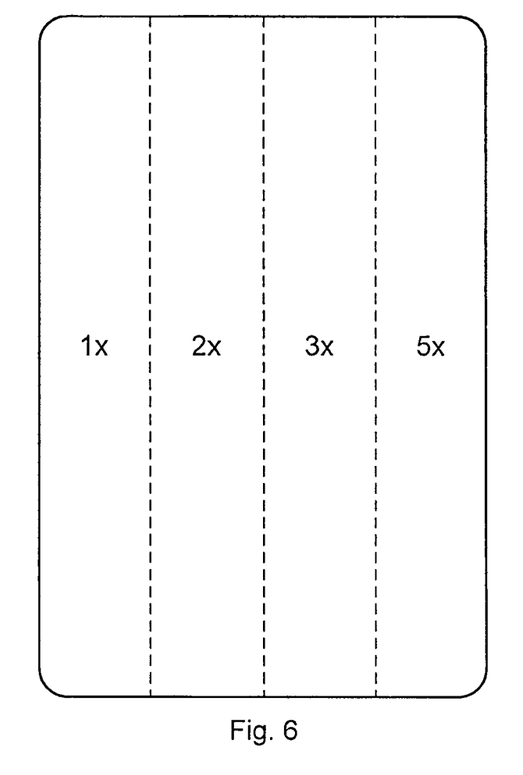
FIG. 6 illustrates an exemplary assignment of scrolling speed relation.

FIG. 6 illustrates an exemplary assignment of scrolling speed relation where discrete scrolling speed relations are assigned to areas of the touch sensitive input area. In FIG. 6, a touch screen is illustrated, but the same principle is applicable to a set-up with a separate touch pad as the touch sensitive input area. Cf. the embodiments of FIGS. 1 and 5 to the embodiments of FIGS. 2 and 3.

As the reader will understand, the similar principles as illustrated in any of FIGS. 1 to 6 are applicable when scrolling is made horizontally, for other relations between content size and screen size, other types of content that is not divided into items, linear and non-linear assignment of scrolling speed relations, etc.

Figure 7:
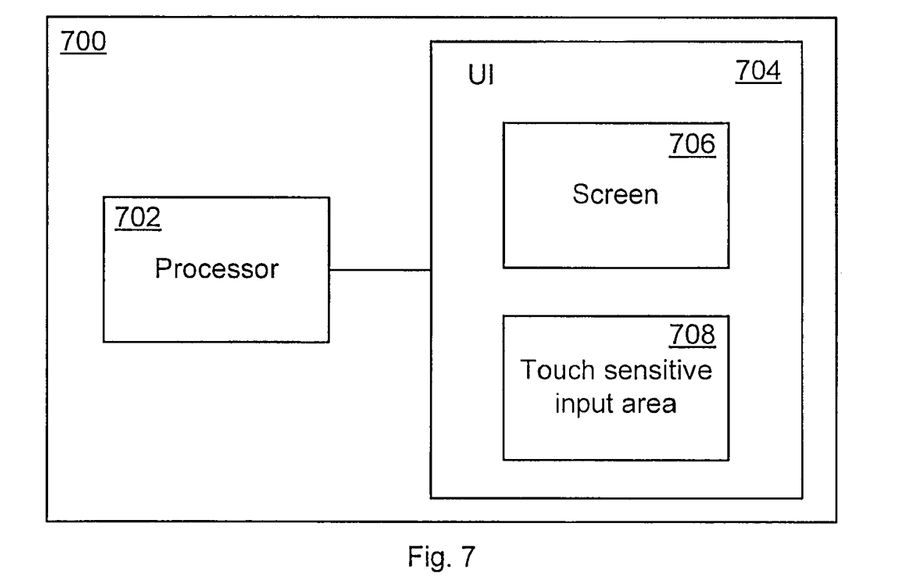
FIG. 7 is a block diagram schematically illustrating an apparatus according to an embodiment of the present invention.

FIG. 7 is a block diagram schematically illustrating an apparatus 700 by its functional elements, i.e. the elements should be construed functionally and may each comprise one or more elements, or be integrated into each other. The apparatus comprises a processor 702 and a user interface UI 704 being controlled by the processor 702. The UI 704 comprises at least a screen 706 and a touch sensitive input area 708. The screen 706 is arranged to view content, which is preferably provided by means of the processor 702. When the content is more spacious than what would fit into the screen 706, only a part of the content is displayed and the content can be scrolled such that a user is able to view a desired part of the content. The touch sensitive input area 708 enables input of touch actions to control the apparatus 700, and also enables control of scrolling of the content. To provide both efficient and accurate control of the scrolling, a speed relation between the scrolling speed and the touch action input speed in the scrolling direction is dependent on touch action input position in a direction perpendicular to the scrolling direction, and thus controllable by the user. The screen 706 and the touch sensitive input area 708 can be integrated to a touch screen. The touch sensitive input area 708 can also be used to select one or more of items of the content, or other editing of the content. Implementation of the functions for scrolling according to the present invention is preferably made by a computer program that is executed by the processor 702 which interprets signals from the touch sensitive input area 708 according to the approaches of the present invention demonstrated above and controls viewing on the screen 706, e.g. scrolling as demonstrated above.

Figure 8:
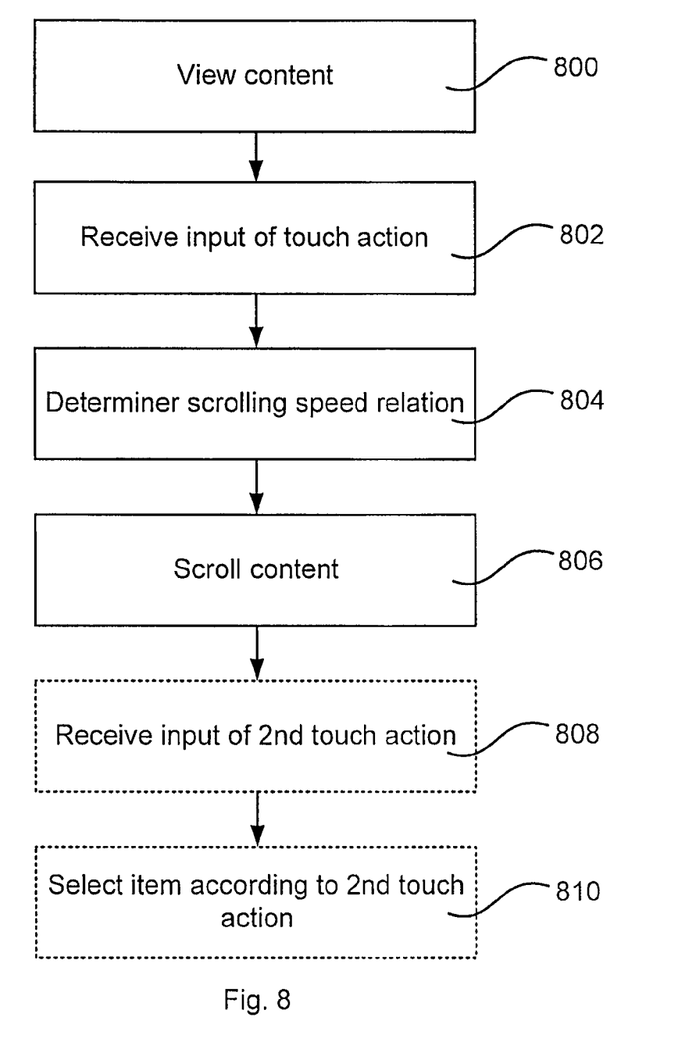
FIG. 8 is a flow chart illustrating a method according to an embodiment of the present invention.

FIG. 8 is a flow chart illustrating a method according to an embodiment of the present invention. In a content viewing step 800, at least a part that fit into a screen of a content is viewed. In a touch action input reception step 802, a touch action input is received from a user actuating a touch sensitive input area. From the touch action input, a scrolling speed relation is determined in a scrolling speed relation determination step 804. The scrolling speed relation is determined according to any of the approaches demonstrated with reference to any of FIGS. 1 to 6. Based on this determination, the content is scrolled in a content scrolling step 806. It should be noted that these steps are not performed consecutively. They should rather be considered to be performed in parallel in the way real-time processes do. Optionally, a second touch action input is received in an optional second touch action input reception step 808, wherein one or more items of the content are selected according to the second touch action input in an item selection step 810.

Figure 9:
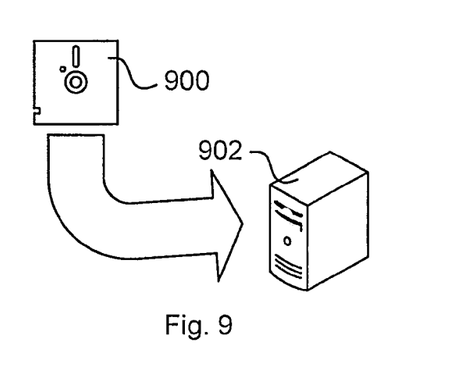
FIG. 9 schematically illustrates a computer program product according to an embodiment of the present invention.

The method according to the present invention is suitable for implementation with aid of processing means, such as computers and/or processors. Therefore, there is provided a computer program comprising instructions arranged to cause the processing means, processor, or computer to perform the steps of the method according to any of the embodiments described with reference to FIG. 8. The computer program preferably comprises program code, as illustrated in FIG. 9, which is stored on a computer readable medium 900, which can be loaded and executed by a processing means, processor, or computer 902 to cause it to perform the method according to the present invention, preferably as any of the embodiments described with reference to FIG. 8. The computer 902 and computer program product 900 can be arranged to execute the program code sequentially where actions of the any of the methods are performed stepwise, but mostly be arranged to execute the program code on a real-time basis where actions of any of the methods are performed upon need and availability of data. The processing means, processor, or computer 902 is preferably what normally is referred to as an embedded system. Thus, the depicted computer readable medium 900 and computer 902 in FIG. 9 should be construed to be for illustrative purposes only to provide understanding of the principle, and not to be construed as any direct illustration of the elements.

The invention claimed is:

1. A user interface comprising
   a screen arranged to display content having a spatial extent greater than a spatial extent of the screen,
     wherein the screen is arranged to display a part of the content on the screen that is less than the spatial extent of the content, and
     wherein the content is spatially scrollable to enable the desired part of the content to be displayed; and a touch sensitive input area arranged to enable input of touch actions,
  wherein a first touch action on said touch sensitive input area controls spatial scrolling of said content in a first direction,
  wherein a speed relation value is determined by the position of the first touch action on said touch sensitive area along a second direction perpendicular to said first direction, and
  wherein the speed relation value controls a speed of the spatial scrolling relative to a speed of the first touch action in the first direction on said touch sensitive input.

2. The user interface according to claim 1, wherein the determined speed relation value has a range of a minimal value at one end of the screen along the second direction, and a maximal value at the other end along the second direction.

3. The user interface according to claim 2, wherein the determined speed relation value range has the maximal value corresponding to the relation between the size of the entire content to the size of the part of the content fitting into the screen.

4. The user interface according to claim 2, wherein the determined speed relation value range has the minimum value of one to one.

5. The user interface according to claim 2, wherein the speed relation value is assigned a continuously increasing value from the minimum value to the maximum value along the second direction.

6. The user interface according to claim 2, wherein the speed relation value is assigned a plurality of discrete values increasing from the minimum value to the maximum value along the second direction.

7. The user interface according to claim 1, wherein a second touch action is adapted to control selection of one item of said content.

8. The user interface according to claim 1, wherein the determined speed relation value has a minimal value at one end of the screen along the second direction, and a maximal value at the other end along the second direction, wherein the determined speed relation value has the maximal value corresponding to the relation between the size of the entire content to the size of the part of the content fitting into the screen, the determined speed relation value has the minimum value of one to one, and the speed relation value is assigned a continuously increasing value from the minimum value to the maximum value along the second direction.

9. The user interface according to claim 1, wherein the determined speed relation value has a minimal value at one end of the screen along the second direction, and a maximal value at the other end along the second direction, wherein the determined speed relation value has the maximal value corresponding to the relation between the size of the entire content to the size of the part of the content fitting into the screen, the determined speed relation value has the minimum value of one to one, and the speed relation value is assigned a plurality of discrete values increasing from the minimum value to the maximum value along the second direction.

10. The user interface according to claim 1, wherein the touch sensitive area is arranged on the screen.

11. An electronic device comprising
a screen arranged to display content having a spatial extent greater than a spatial extent of the screen,
  wherein the screen is arranged to display a part of the content on the screen that is less than the spatial extent of the content, and
  wherein the content is spatially scrollable to enable the desired part of the content to be displayed; and
a touch sensitive input area that outputs signals indicative of touch actions; and
a processor that receives and processes the signals from the touch sensitive input area so that a first touch action on said touch sensitive area controls spatial scrolling of said content in a first direction,
  wherein the processor determines a speed relation value by the position of the first touch action on said touch sensitive area along a second direction perpendicular to said first direction, and
  wherein the speed relation value controls a speed of the spatial scrolling relative to a speed of the first touch action in the first direction on said touch sensitive input.

12. The apparatus according to claim 11, wherein the determined speed relation value has a range of a minimal value at one end of the screen along the second direction, and a maximal value at the other end along the second direction.

13. The apparatus according to claim 12, wherein the determined speed relation value range has the maximal value corresponding to the relation between the size of the entire content to the size of the part of the content fitting into the screen.

14. The apparatus according to claim 12, wherein the determined speed relation value range has the minimum value of one to one.

15. The apparatus according to claim 12, wherein the speed relation value is assigned a continuously increasing value from the minimum value to the maximum value along the second direction.

16. The apparatus according to claim 12, wherein the speed relation value is assigned a plurality of discrete values increasing from the minimum value to the maximum value along the second direction.

17. The apparatus according to claim 11, wherein a second touch action is adapted to control selection of one item of said content.

18. The apparatus according to claim 11, wherein the touch sensitive area is arranged on the screen.

19. A user interface method comprising
displaying a part of a content on a screen, the content having a spatial extent greater than a spatial extent of the screen, including
  spatially scrolling the content where the screen is arranged to display a part of the content on the screen to enable the desired part of the content to be displayed; and
receiving input of touch actions on a touch sensitive input area, wherein a first touch action controls spatial scrolling of said content in a first direction, including
  determining a speed relation value by the position of the first touch action on said touch sensitive input area along a second direction perpendicular to said first direction, and controlling, in accordance with the speed relation value, a speed of the spatial scrolling relative to a speed of the first touch action in the first direction on said touch sensitive input.

20. The method according to claim 19, wherein the determined speed relation value has a range of a minimal value at one end of the screen along the second direction, and a maximal value at the other end along the second direction, wherein the determined speed relation value has the maximal value corresponding to the relation between the size of the entire content to the size of the part of the content fitting into the screen.

21. The method according to claim 19, wherein the determined speed relation value has a range of a minimal value at one end of the screen along the second direction, and a maximal value at the other end along the second direction, wherein the determined minimum speed has the minimum value of one to one.

22. The method according to claim 19, further comprising assigning a continuously increasing speed relation value from a minimum value to a maximum value along the second direction.

23. The method according to claim 19, wherein assigning the speed relation value comprises assigning a plurality of discrete values increasing from a minimum value to a maximum value along the second direction.

24. The method according to claim 19, further comprising receiving a second touch action adapted to control selection of one item of said content.

25. A non-transitory computer readable medium comprising program code, which when executed by a processor is arranged to cause the processor to perform
   displaying a part of a content on a screen, the content having a spatial extent greater than a spatial extent of the screen, including
      spatially scrolling the content where the screen is arranged to display a part of the content on the screen to enable the desired part of the content to be displayed; and
   receiving input of touch actions on a touch sensitive input area, wherein a first touch action controls spatial scrolling of said content in a first direction, including
      determining a speed relation value by the position of the first touch action on said touch sensitive input area along a second direction perpendicular to said first direction, and controlling, in accordance with the speed relation value, a speed of the spatial scrolling relative to a speed of the first touch action in the first direction on said touch sensitive input.

26. The user interface according to claim 1, wherein
   the determined speed relation value has a range of a minimal value at one end of the screen along the second direction, and a maximal value at the other end along the second direction; and
   the speed relation value is dynamically adjusted during scrolling in said first direction in accordance with movement of the touch action in the second direction.

27. The apparatus according to claim 11, wherein
   the determined speed relation value has a range of a minimal value at one end of the screen along the second direction, and a maximal value at the other end along the second direction; and
   the speed relation value is dynamically adjusted during scrolling in the first direction in accordance with movement of the touch action in the second direction.

28. The method according to claim 19, wherein the determined speed relation value has a range of a minimal value at one end of the screen along the second direction and a maximal value at the other end along the second direction, and the method further comprises dynamically adjusting the speed relation value during scrolling in the first direction in accordance with movement of the touch action in the second direction.

29. The non-transitory computer readable medium according to claim 25, wherein
   the determined speed relation value has a range of a minimal value at one end of the screen along the second direction, and a maximal value at the other end along the second direction; and
   the speed relation value is dynamically adjusted during scrolling in the first direction in accordance with movement of the touch action in the second direction.

\* \* \* \* \*